United States Patent Office 3,733,365
Patented May 15, 1973

3,733,365
PROCESS FOR ORTHO-ALKYLATION
Ernest Leon Yeakey and Clarence Edward Keller, Austin, Tex., assignors to Jefferson Chemical Company, Inc., Houston, Tex.
No Drawing. Filed May 5, 1969, Ser. No. 821,971
Int. Cl. C07c 39/06
U.S. Cl. 260—624 C    9 Claims

ABSTRACT OF THE DISCLOSURE

Aromatic compounds such as hydroxyaromatics and aromatic amines are selectively ortho-alkylated with an olefin in the presence of a catalyst of a polymeric aluminum alcoholate, aluminum hydroxide condensed with an aluminum alcoholate, or active alumina activated with an aluminum alcoholate. The ortho-alkylated products of our invention are used industrially as antidegradants for materials subject to degradation caused by oxygen or ozone.

CROSS-REFERENCE TO RELATED APPLICATIONS

U.S. Pat. 3,542,750 (1970) of Hideo Tomomatsu discloses catalysts obtained by condensing aluminum hydroxide with an aluminum alcoholate which are useful in our process. The co-pending U.S. patent application of Hideo Tomomatsu, Ser. No. 821,972, filed May 5, 1969, discloses catalysts obtained by activating active alumina with an aluminum alcoholate which are also useful in our process.

BACKGROUND OF THE INVENTION

Field of the invention

This invention pertains to a process using new catalysts for the selective ortho-alkylation of phenols and aromatic amines.

Description of the prior art

George G. Ecke's U.S. Pat. 2,831,898 (1958) discloses the use of aluminum phenoxide and magnesium phenoxide at catalyst for the ortho-alkylation of phenols. John L. Van Winkle's U.S. Pats. 3,116,336 (1963) and 3,177,259 (1965) disclose the use of dialkyl sulfates, and sulfonic acids, respectively, as catalysts for the ortho-alkylation of phenols. These catalysts are soluble in the starting materials and products and are difficult to remove from the reaction mixture. Our process uses catalysts which are essentially insoluble under the reaction conditions of the process. The catalysts can be easily removed from the products of our process, hence the catalysts can be reused if desired. Gerd Leston's U.S. Pat. 3,267,153 discloses the use of aluminum salts of an ortho-phenol-sulfonic acid as catalysts for the ortho-alkylation of phenols. Leston's catalysts are only insoluble at lower temperatures than the reaction temperature which renders a continuous process impractical. Since the catalysts used in our invention are insoluble under reaction conditions, a continuous process can be used. Napolitano's U.S. Pat. 3,367,981 discloses the use of a transitional alumina as an insoluble catalyst for the ortho-alkylation of phenols.

SUMMARY OF THE INVENTION

The invention is an improved process for the selective ortho-alkylation of aromatic compounds containing electron donating substituents. The improvement is heating the aromatic compound with an olefin in the presence of a catalyst of a polymeric aluminum alcoholate, the condensation product of aluminum hydroxide and an aluminum alcoholate, or an active alumino activated with an aluminum alcoholate. High percentages of mono-ortho-alkylation are obtained by using the process of our invention. In addition, shorter reaction times and lower reaction temperatures than those disclosed in the prior art can be economically used in our process. Our invention can be used in a continuous or a batch process since the catalysts are insoluble under reaction conditions.

DESCRIPTION OF THE PREFERRED EMBODIMENTS

The catalysts useful in our process are polymeric aluminum alcoholates, condensation products of aluminum hydroxide and an aluminum alcoholate, or active alumina activated with an aluminum alcoholate.

The polymeric aluminum alcoholates for use in our invention may be represented by the formula:

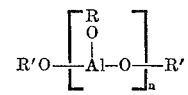

wherein R is an aliphatic, cycloaliphatic or aromatic hydrocarbon radical containing from 1 to 18 carbon atoms, R' is hydrogen or R, and $n$ is at least 2. For example, R may be ethyl, isopropyl, butyl, cyclohexyl, nonyl, octadecyl, benzyl, phenyl and naphthyl. The degree of polymerization of such products is at least 2 and may be 50 to 100 or higher. Methods for the preparation of such polymers are known, and the particular way in which the polymer is prepared is immaterial insofar as our invention is concerned. Their preparation is described, for example, by Andrianov, Metallorganic Polymers, Interscience Publishers, New York (1965), p. 327. A particularly preferred polymeric aluminum alcoholate for our process is that prepared from aluminum isopropoxide.

The preparation of the catalysts of active alumina activated with an aluminum alcoholate is described in Hideo Tomomatsu's co-pending U.S. patent application Ser. No. 832,972, filed May, 5, 1969, and the preparation of the condensation products of aluminum hydroxide and an aluminum alcoholate is described in Hideo Tomomatsu's co-pending U.S. Patent 3,542,750 (1970). The aluminum alcoholate may be an aluminum alkoxide, an aluminum cycloalkoxide, or an aluminum aryloxide. The aluminum alkoxides useful in preparing the catalysts of this invention have the formula $Al(OC_nH_{2n+1})_3$ wherein $n$ is one, two, three or four. Typical examples of aluminum alkoxides which may be used are aluminum methoxide, aluminum ethoxide, aluminum propoxide, aluminum isopropoxide, aluminum sec-butoxide and aluminum tert-butoxide. In addition, aluminum benzylate is a further example of an aluminum alkoxide useful in our invention. A typical aluminum cycloalkoxide useful in the practice of our invention is aluminum cyclohexanolate. A typical aluminum aryloxide useful in the practice of our invention is aluminum phenoxide.

The aromatic compounds containing electron donating substituents are, for example, hydroxyaromatic compounds having one or more aromatic rings and at least one hydroxyl or OH group on at least one of the rings. Such compounds include hydroxybenzenes, hydroxynaphthalenes, hydroxyanthracenes, hydroxyphenanthrenes, and the like. The aromatic compounds containing electron donating substituents also include, for example, aromatic amine compounds having one or more aromatic rings and at least one amino group on at least one of the rings. Such compounds include aniline, naphthylamines, anthraceneamines, phenanthreneamines, and the like. The amines used can have other ring substituents, preferably alkyl.

The olefinic reactants which are employed to ortho-alkylate the aromatic compounds of the type described are the unsaturated hydrocarbons having one or more olefinic double bonds. Preferred olefins are those compounds having up to two olefinic, i.e., non-aromatic, double bonds and from two to twenty carbon atoms. The olefins may be acyclic, as in the case of ethylene, propylene, butylene, butadiene, isobutylene, amylene, hexylene, isoprene, dodecene, eicosene, and the like, or they may be cyclic, e.g., cyclopentene, cyclohexene. The olefins may also have aromatic substituents, as exemplified by styrene, alpha-methylstyrene, divinylbenzene, allylbenzene, and the like. Of these olefins, the most preferred class, which affords ortho-alkylated aromatics having the most desirable properties, are the mono-olefins having from two to twelve carbon atoms. Particularly preferred members of this class of mono-olefins are those acyclic mono-olefins having from 3 to 5 carbon atoms, e.g., propylene, butylene, isobutylene, amylene and isoamylene.

The reaction conditions of the process include a temperature range from about 100° C. to about 300° C. and higher, pressures from 0 p.s.i.g. to 3000 p.s.i.g. but usually the autogenous pressure of the system when the reaction is conducted in a batch process, and holding times from about 0.25 hour to 5 hours. A suitable solvent may be used in the process. The following examples illustrate our invention in more detail. Example I illustrates the selective ortho-alkylation of phenol using a catalyst of polymeric aluminum isopropoxide. Example II illustrates the ortho-alkylation of phenol using a catalyst of the condensation product of aluminum hydroxide and aluminum isopropoxide. Example III illustrates the selective ortho-alkylation of phenol using a catalyst of active alumina activated with aluminum isopropoxide.

EXAMPLE I

A solution of phenol (141 g., 1.5 mols) in benzene (141 g.) was placed in a one-liter, stirred autoclave along with 14 g. of polymeric aluminum isopropoxide. The clave was closed, a nitrogen atmosphere provided, and 168 g. isobutylene (3.0 mols) was pressured in. Heating to 250° C. was begun with the reaction initiating in the range 200–250° C. After about 1 hr. at 250° C. the reaction was substantially complete. The product was a liquid containing a white, granular solid. Following filtration to remove the solid, the solvent was removed by distillation at 30 mm. Hg and the residue fractionated. The major fraction (B.P. 110–115° C., 30 mm. Hg), amounting to 51% by weight of the distillation charge was shown by analysis to be o-tert.-butylphenol. Thus selective ortho-alkylation was achieved.

EXAMPLE II

An experiment was conducted essentially as described in Example I except that the maximum temperature was 225° C. and the catalyst was 12.5 g. of a material prepared by the condensation of aluminum hydroxide with aluminum isopropoxide. In this experiment the reaction was completed during the 0.75 hour period required to heat the clave contents to 225° C. Analysis of the product mixture by gas-liquid chromatography showed mono-tert.-butylphenols to be present at an ortho/para ratio 21.6/1. On an area percent basis only 10.4% unreacted phenol remained and 58.5% of the total reaction mixture (solvent free) was o-tert.-butylphenol.

EXAMPLE III

An experiment was conducted essentially as described in Example II except that the catalyst was 5 g. of a material prepared by interaction of active alumina and aluminum isopropoxide. The reaction was completed during the 1 hour 5 minute period required to heat the clave contents to 225° C. Analysis of the product mixture by gas-liquid chromatography showed mono-tert.-butylphenols to be present at an ortho/para ratio of 40.7/1. On an area percent basis only 8.3% unreacted phenol remained and 60.2% of the total reaction mixture (solvent free) was o-tert.-butylphenol.

Results comparable to those in the examples, supra, are obtained using other catalysts and reactants within the scope of our invention.

Examples IV and V illustrate the preparation of the catalysts useful in our process prepared from aluminum hydroxide or alumina reacted with an aluminum alcoholate.

EXAMPLE IV

This example illustrates the preparation of a typical catalyst useful in our process prepared from aluminum hydroxide and an aluminum alcoholate. Aluminum hydroxide powder (7.89 grams, 0.1 mol), commercially analyzed reagent $Al(OH)_3$ content 100.0%, was further pulverized and mixed with 40.8 grams (0.2 mol) of freshly distilled aluminum isopropoxide. The mixture was heated under dry nitrogen with stirring for one hour from 120° to 250° C. The effluent, isopropyl alcohol, was continuously removed from the reaction mixture by a water cooled condenser. The reaction was stopped when 0.3 mol of isopropyl alcohol had been removed. The distillation residue so obtained was 33 grams of an aluminum compound. The chemical structure of the product of the reaction between aluminum hydroxide and an aluminum alcoholate may be varied by changing the mol ratio of aluminum hydroxide to aluminum alcoholate and by controlling the amount of alcohol eliminated during the reaction. The mol ratio of aluminum hydroxide to aluminum alcoholate may be varied from about 1:10 to about 10:1. An excess of aluminum hydroxide or alcoholate does not hinder the catalytic effect of the catalyst. The preferred ratio is 1 mol aluminum hydroxide to 2 mols aluminum alcoholate. Due to the limitations of analytical techniques, the catalyst obtained cannot be definitely structurally identified.

EXAMPLE V

This example illustrates the preparation of a typical catalyst useful in our process prepared from active alumina activated with an aluminum alcoholate. Commercial active alumina (10.1 g., 0.1 mol) was pulverized and placed with 25.0 g. of n-tetradecane in a 500 ml. flask equipped with a magnetic stirring bar, distilling head, condenser fitted with a drying tube, and thermometer. To the mixture was added 20.4 g. (0.1 mol) of freshly distilled aluminum isopropoxide and the mixture was stirred magnetically. The mixture was heated gradually and 6.3 ml. (4.92 g., 0.082 mol) of isopropyl alcohol was recovered at the boiling point of 81° to 83° C. requiring 2½ hours. During this period the reaction mixture was blanketed with dry nitrogen and the kettle temperature reached 200° to 250° C. After this treatment, the system was subjected to 10 mm. Hg vacuum and the reaction mixture was heated to 155° C., however, only a small amount of aluminum isopropoxide was recovered from the reaction mixture. The mol ratio of alumina to aluminum alcoholate may be varied from about 1:10 to about 10:1. The preferred ratio is one mol alumina to one mol aluminum alcoholate. Due to the limitations of analytical techniques, the activated alumina catalyst obtained cannot be definitely structurally identified.

We claim:

1. In a process for the ortho-alkylation of hydroxyaromatic compounds having one or more aromatic rings and at least one OH group on at least one of the rings wherein the hydroxyaromatic compound is selected from the group consisting of hydroxybenzenes, hydroxynaphthalenes, hydroxyanthracenes and hydroxyphenanthrenes and wherein the hydroxyaromatic compound is reacted with olefinic hydrocarbon in a closed vessel at a temperature within the range from about 100° C. to about 300° C., the improvement which comprises:

carrying out the reaction in the presence of a catalyst selected from
(a) a polymeric aluminum alcoholate represented by the formula:

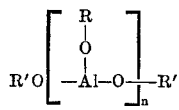

wherein R is an aliphatic, cycloaliphatic or aromatic hydrocarbon radical containing from 1 to 18 carbon atoms, R' is hydrocarbon or R, and $n$ is at least 2;
(b) a condensation product of aluminum hydroxide and an aluminum alkoxide, an aluminum aryloxide or an aluminum cycloalkoxide prepared by mixing the aluminum hydroxide and aluminum alkoxide, aluminum aryloxide or aluminum cycloalkoxide in a mol ratio of from about 1:10 to 10:1 of the aluminum hydroxide to the oxide at a temperature up to 250° C.; or
(c) active alumina activated with an aluminum alkoxide, an aluminum cycloalkoxide or an aluminum aryloxide prepared by mixing active alumina with an aluminum alkoxide, an aluminum cycloalkoxide or an aluminum aryloxide in a mol ratio of 1:10 to 10:1 of active alumina to the oxide at a temperature up to 250° C.

2. A process according to claim 1 wherein the hydroxyaromatic compound is a monohydroxyaromatic compound and the olefin is a compound containing from 2 to 20 carbon atoms.

3. A process according to claim 2 wherein a hydroxy aromatic compound is heated with an olefin containing 2 to 12 carbon atoms.

4. A process according to claim 3 wherein phenol or naphthol is heated with the olefin in the presence of a catalyst of polymeric aluminum alcoholate.

5. A process according to claim 4 wherein phenol is heated with isobutylene in the presence of a catalyst of polymeric aluminum isopropoxide.

6. A process according to claim 3 wherein phenol or naphthol is heated with the olefin in the presence of a catalyst of the condensation product of aluminum hydroxide and an aluminum alkoxide.

7. A process according to claim 6 wherein phenol is heated with isobutylene in the presence of a catalyst of the condensation product of aluminum hydroxide and aluminum isopropoxide.

8. A process according to claim 3 wherein phenol or naphthol is heated with the olefin in the presence of a catalyst of active alumina activated with an aluminum alkoxide.

9. A process according to claim 8 wherein phenol is heated with isobutylene in the presence of a catalyst of active alumina activated with aluminum isopropoxide.

References Cited

UNITED STATES PATENTS

| | | | |
|---|---|---|---|
| 2,450,766 | 10/1948 | Nixon et al. | 260—624 C |
| 3,129,264 | 4/1964 | Hunt | 260—624 R |
| 3,355,504 | 11/1967 | Coffield et al. | 260—624 R |
| 3,422,156 | 1/1969 | Thomas | 260—621 R |

FOREIGN PATENTS

| | | | |
|---|---|---|---|
| 806,182 | 12/1958 | Great Britain | 260—624 C |
| 1,142,873 | 1/1963 | Germany | 260—624 C |

BERNARD HELFIN, Primary Examiner

W. B. LONE, Assistant Examiner

U.S. Cl. X.R.

260—578, 619 R, 619 D